United States Patent [19]

Bauman

[11] Patent Number: 5,376,055
[45] Date of Patent: Dec. 27, 1994

[54] TRANSMISSION CHAIN WITH READILY ENGAGEABLE CONNECTING PIN

[76] Inventor: Robert C. Bauman, 232 Goodhouse Rd., Litchfield, Conn. 06759

[21] Appl. No.: 99,228

[22] Filed: Jul. 29, 1993

[51] Int. Cl.⁵ ............................................. F16G 15/10
[52] U.S. Cl. ................................. 474/218; 474/220; 474/222; 474/225
[58] Field of Search ........................ 474/218–220, 474/222, 224, 225, 227; 305/900, 58 R; 59/7

[56] References Cited

U.S. PATENT DOCUMENTS

| | | | |
|---|---|---|---|
| 304,625 | 9/1884 | Doubleday | 474/222 |
| 583,167 | 5/1897 | Caldwell | 474/220 |
| 586,956 | 7/1897 | Barker et al. | |
| 602,633 | 4/1898 | Ecaubert. | |
| 745,975 | 12/1903 | Sweany | 474/218 |
| 892,965 | 7/1908 | Sevcik. | |
| 1,303,853 | 5/1919 | Clark. | |
| 1,634,645 | 7/1927 | Bens | 474/219 X |
| 2,389,874 | 11/1945 | Searles et al. | 474/222 X |
| 2,452,242 | 10/1948 | Johnson. | |
| 2,696,742 | 12/1954 | Otto et al. | |
| 2,780,830 | 2/1957 | Kammerer | 474/222 X |
| 2,970,866 | 2/1961 | Horste | 474/222 X |
| 3,171,695 | 3/1965 | Schick. | |
| 3,309,864 | 3/1967 | Arndt et al. | 474/222 X |
| 3,379,072 | 4/1968 | Kuntzmann | 474/222 X |
| 3,665,704 | 5/1972 | Trudeau | 59/85 |
| 4,143,512 | 3/1979 | Templin | 59/85 |
| 4,220,052 | 9/1980 | Sheldon | 474/207 |
| 4,263,779 | 4/1981 | Petershack | 474/227 X |
| 4,378,719 | 4/1983 | Burgess | 474/222 X |
| 4,983,147 | 1/1991 | Wu | 474/206 |

*Primary Examiner*—Roger J. Schoeppel

[57] ABSTRACT

An elongated transmission chain is formed by roller assemblies and pairs of link plates extending in parallel spaced relationship outwardly of the roller assemblies to provide a pivotable connection therebetween. A master link pivotably connects the ends of the elongated chain and includes a pair of link plates overlapping the side plates of the roller assemblies at the ends of the chain. These master link plates have a pair of spaced apertures therein which are coaxially aligned with the apertures in the adjacent rollers of the roller assemblies at the ends of the chain. A pair of threaded fasteners seat in these apertures and extend between the master link plates and through the side plates and rollers. These fasteners are threadably engaged in assembly with the master link plates and are of length not greater than the spacing between the outer surfaces of the master link plates so that they do not extend outwardly thereof.

12 Claims, 3 Drawing Sheets

TRANSMISSION CHAIN WITH READILY ENGAGEABLE CONNECTING PIN

BACKGROUND OF THE INVENTION

The present invention relates to transmission chains, and more particularly to transmission chains employing a readily engageable master link.

Transmission chains of various types are not only widely used in industrial apparatus for many applications, but also are commonly used on bicycles and other human or mechanically powered vehicles to transfer drive power. Frequent removal of the transmission chain from the apparatus or bicycle is desirable to allow for lubrication and cleaning of the chain, especially when operated in dusty or dirty environments.

The roller elements of most transmission chains are joined by riveted links, and a master link is typically provided to enable joinder of the ends of the chain. Although some master links utilize threaded fasteners, most do not provide a mechanism to avoid inadvertent disengagement of the threaded fastener from the rest of the master link. In the master links which use some locking mechanism for the threaded fastener, the locking mechanism generally extends beyond the side margins of the link. If the fastener protrudes, this may interfere with other parts of the apparatus or bicycle, such as a gear changing mechanism, and collect contaminants on the protruding surface.

It is an object of the present invention to provide a novel transmission chain which can be easily connected and disconnected for lubrication and cleaning.

Another object is to provide such a transmission chain having threaded fasteners which is releasably locked in assembly to avoid inadvertently disengagement.

Another object is to provide such a transmission chain in which the fastener in the master link is disposed within the width of the master link plates.

SUMMARY OF THE INVENTION

It has now been found that the foregoing and related objects may be readily attained in a transmission chain comprising a multiplicity of roller assemblies each including a pair of rollers, a pair of roller side plates extending in parallel spaced relationship outwardly of the rollers, and means securing the rollers and side plates in assembly. A multiplicity of pairs of link plates extend in parallel spaced relationship outwardly of the side plates and pivotably connect adjacent ends of the roller assemblies to provide an elongated chain.

A master link connects the ends of the elongated chain and comprises a pair of parallel spaced master link plates overlapping the side plates of the roller assemblies at the ends of the elongated chain. The master link plates have a pair of spaced apertures therein which are coaxially aligned with the apertures in the adjacent rollers of the roller assemblies at the ends of the chain. The master link also has a pair of threaded fasteners in these apertures and they extend between the master link plates and through the side plates and rollers at the adjacent ends of the roller assemblies to pivotably connect the roller assemblies at the chain ends. The fasteners are threadably engaged in assembly with the master link plates and are of length not greater than the spacing between the outer surfaces of the master link plates so that they do not extend outwardly thereof.

Generally, the roller plates and master link plates have aligned apertures therein, and the roller assemblies include a pair of cylindrical bushings disposed between and secured in the apertures of the roller plates. As a result, the rollers are rotatably mounted on the bushings and the fasteners extend therethrough.

Desirably, there is included means releasably locking the fasteners in the master link plates, and this locking means may be a thread locking compound in one embodiment. In another embodiment, the locking means is provided by fasteners having that portion of its threaded length seated in the aperture of one master link plate of a different pitch than the thread of the aperture so that the forced engagement of the threads of different pitch lockingly engages the fastener with the master link plate. In still another embodiment, the locking means is provided by fasteners having one end complementarily threaded to the thread of the aperture of the master link plate in which it is seated and its other end flared outwardly so that the flared end is force fit into the aperture of the master link plate in which it is seated.

In a further embodiment, the threaded fasteners may comprise male and female components with enlarged end portions seated in the apertures of the master link plates and the male components having threaded shanks threadably engaged in threaded bores in the female components.

DETAILED DESCRIPTION OF THE PREFERRED EMBODIMENT

Figure 1:
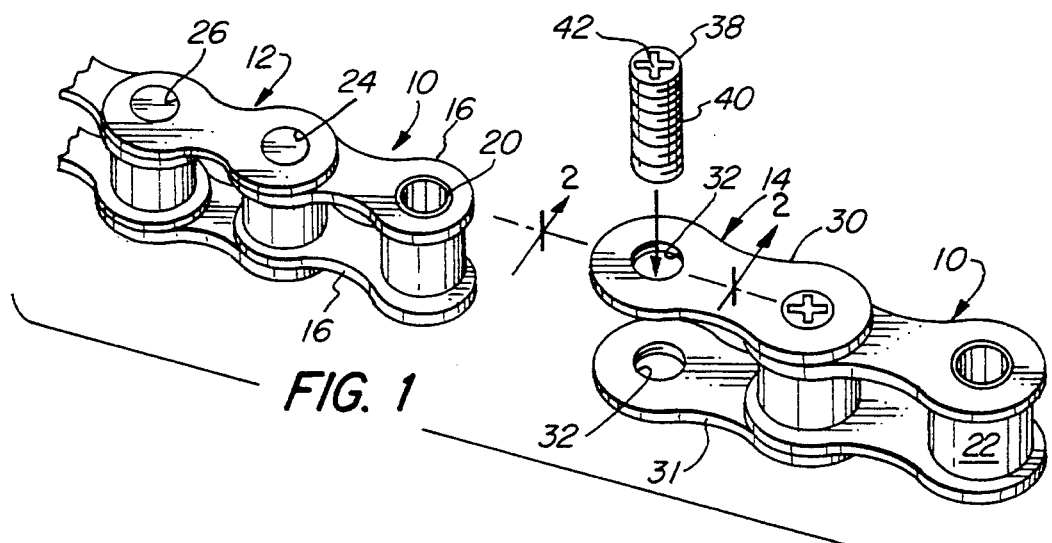
FIG. 1 is a fragmentary perspective view of a transmission chain embodying the present invention, with the master link assembly disconnected from the adjacent roller assembly, the threaded fastener shown removed from the master link side plates, and the arrow indicating the direction of insertion of the threaded fastener.
Figure 2:
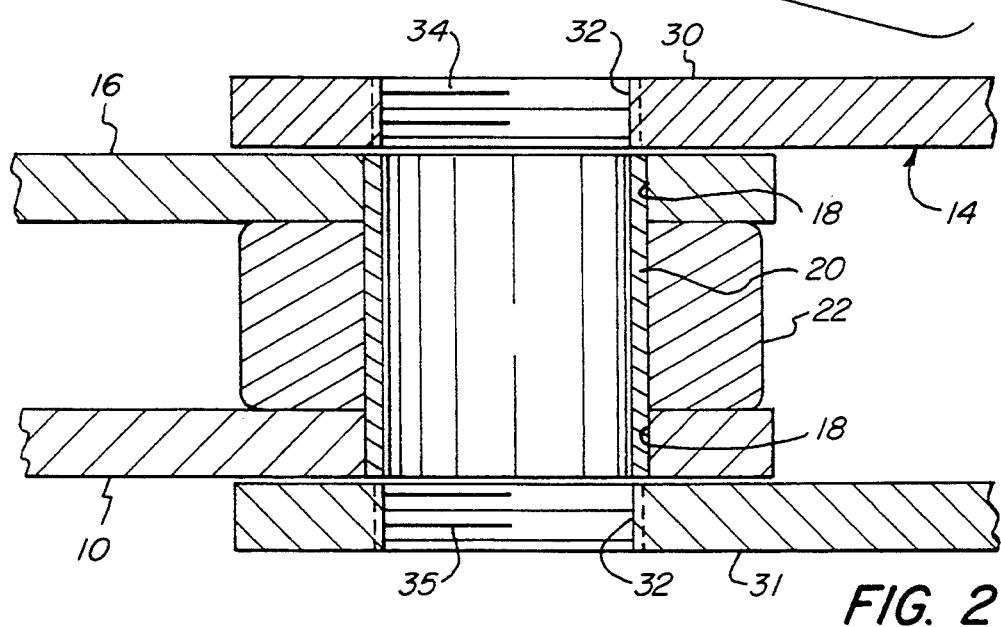
FIG. 2 is a fragmentary cross section view of the transmission chain of FIG. 1 taken along the line 2—2 drawn to an enlarged scale and with the opposite roller assembly seated in the master link.
Figure 3:
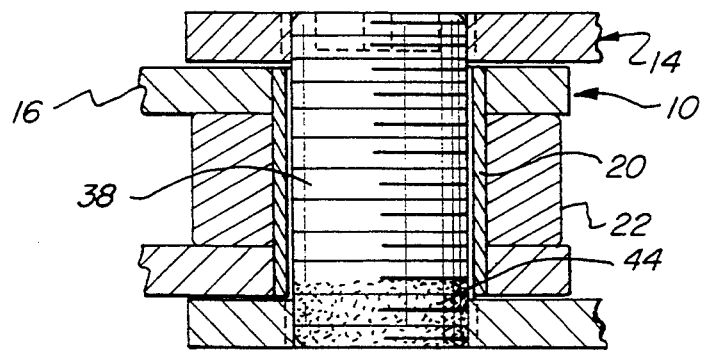
FIG. 3 is a view similar to FIG. 2, but in reduced scale and with the threaded fastener positioned within the master link assembly and roller assembly.

Turning first to FIGS. 1–3, therein illustrated is a transmission chain embodying the present invention with a multiplicity of roller assemblies generally designated by the numeral 10, a multiplicity of pairs of link plates generally designated by the numerals 12 and connecting the adjacent ends of the roller assemblies 10 to form a chain, and a master link assembly generally designated by the numeral 14 to connect the ends of the chain.

Turning specifically to the structure of the roller assemblies 10, each includes a pair of roller side plates 16 with a pair of spaced apertures 18. The roller side plates 16 are positioned parallel to each other with their apertures 18 aligned, and disposed between the opposing aligned apertures 18 is a pair of cylindrical bushings 20 positioned parallel to each other and perpendicularly to the roller side plates 16. The ends of the bushings 20 are press fit into the opposing aligned apertures 18 in the roller side plates 16, and rollers 22 are concentrically and rotatably disposed about each bushing 20 between the roller side plates 16.

Adjacent roller assemblies 10 are pivotably connected by pairs of link plates 12 overlapping the adjacent ends of a pair of adjacent roller assemblies 10. The link plates 12 are each provided with a pair of spaced apertures 24 in alignment with the adjacent apertures 18 of adjacent roller side plates 16. The link plates 12 are secured to the ends of the adjacent roller assemblies 10 by rivets 26 which pass through the apertures 24 in the link plates 12 and the axial passage in the bushing 20. The rivets 26 are force fit into the apertures 24 in the link plates 12 to secure them therein. As will be appreciated, the rivets 26 may also function as the bushing in some chains.

The master link assembly 14 pivotably couples the two ends of the chain formed by the roller assemblies 10 and is comprised of a pair of master link plates 30, 31 disposed parallel to each other and overlapping the adjacent ends of the roller assemblies 10 at the ends of the chain. The master link plates 30 have a pair of spaced apertures 32 which are threaded as indicated by the numerals 34 and 35. The apertures 32 are aligned with the apertures 18 in the adjacent roller side plates 16 of the roller assemblies 10. Threaded fasteners 38 are threadably engaged through the aperture 32 in one master link plate 30, extend through the passage in the bushing 20, and are threadably engaged in the aperture 32 in the other master link plate 31. The threads 34 and 35 are complementary to the threads 40 on the fastener 38.

A Phillips head recess 42 in the end of the threaded fastener 38 is adapted to receive the drive tip of a Phillips screwdriver (not shown). FIGS. 8A–8D show various configurations for the drive recesses.

To provide resistance to the inadvertent rotation of the threaded fastener 38 relative to the master link plates 30, 31, a thread locking compound 44 is placed between the threads 35 of the aperture 33 of the master link plate 30 and the threads 40 on the fastener 38.

Figure 4:
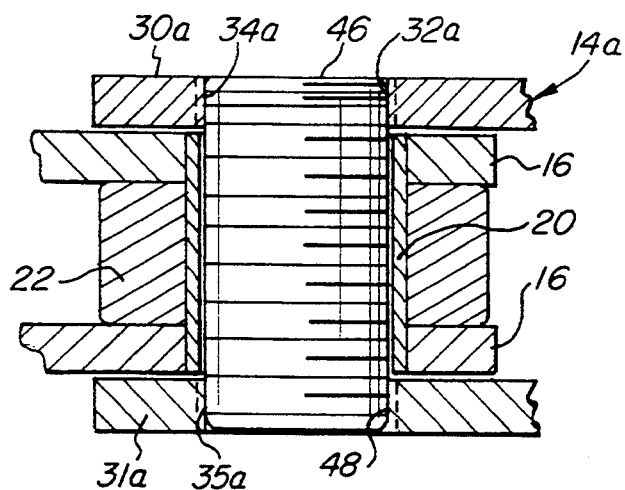
FIG. 4 is a view similar to FIG. 3 showing another embodiment of the master link assembly of the present invention.
Figure 5:
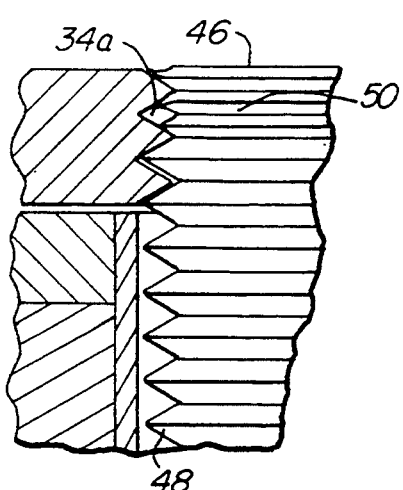
FIG. 5 is a fragmentary view, to an enlarged scale, of a portion of the master link assembly and roller assembly of FIG. 4, showing thread detail.

Referring next to FIGS. 4 and 5, there is shown an alternate embodiment of the master link assembly which is generally designated by the numeral 14a. The threaded fastener 46 has a thread configuration 48 over most of its length which is complementary to the threads 34a, 35a of the apertures 32a of the master link side plates 30a, 31a. A locking thread portion 50 having a thread pitch greater than the thread pitch of the threads 34a in the aperture 32a is provided at the upper end of the fastener 46. This difference in the thread pitch causes compression of the locking thread 50 and the threads 34a in the aperture 32a in the master link plate 30a, thereby resisting the backing out of the threaded fastener 46 from the master link plates 30a, 31a.

As a variation of this embodiment, the threaded fastener 46 may have a tread pitch 48 extend along its entire length, while the aperture 33a in the lower master link plate 31a has a greater thread pitch. In this instance the aperture 32a in the master link plate 30a has a thread pitch complementary to the thread pitch 48 on the fastener 46. This structure also results in thread compression and resistance to the backing out of the threaded fastener 46 from the master link plates 30a and 31a.

Figure 6:
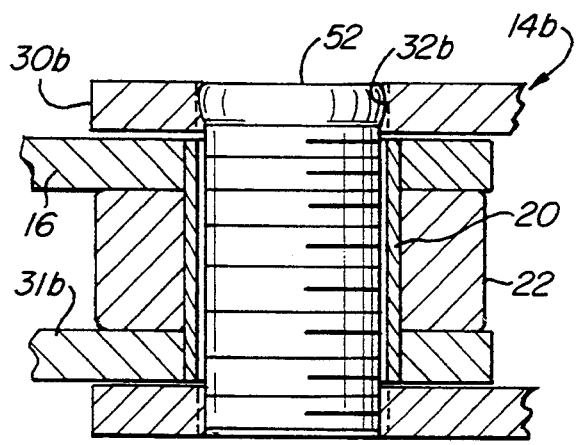
FIG. 6 is a view similar to FIG. 3 showing still another embodiment of a master link assembly embodying the present invention.
Figure 7:
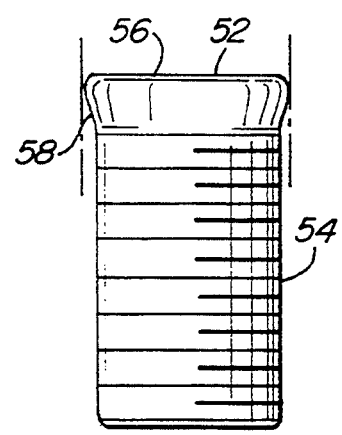
FIG. 7 is a view of the threaded fastener of the link assembly of FIG. 6.
Figure 8A:
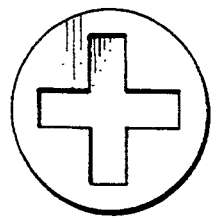
FIGS. 8A–8D are top plan views of threaded fasteners, showing various drive recesses to receive a driving tool.
Figure 8B:
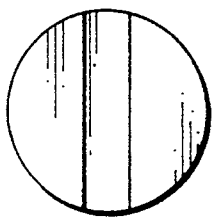
Figure 8C:
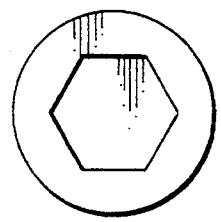
Figure 8D:
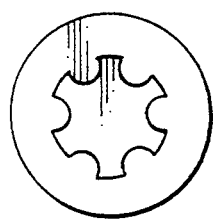

Referring next to FIGS. 6 and 7, there is shown another embodiment of a master link assembly generally designated by the numeral 14b. The threaded fastener 52 is provided with a threaded shank 54 and a head 56 with an outwardly tapered side surface 58. As the thread shank 54 is threaded into the threaded surface 35b of the aperture 33b in the master link plate 31b, the outwardly tapered side surface 58 of the head 56 is forced into the aperture 32b of the master link plate 30b, thereby creating a resistance to the backing out of the fastener 52 from the master link plates 30b and 31b.

Figure 9:
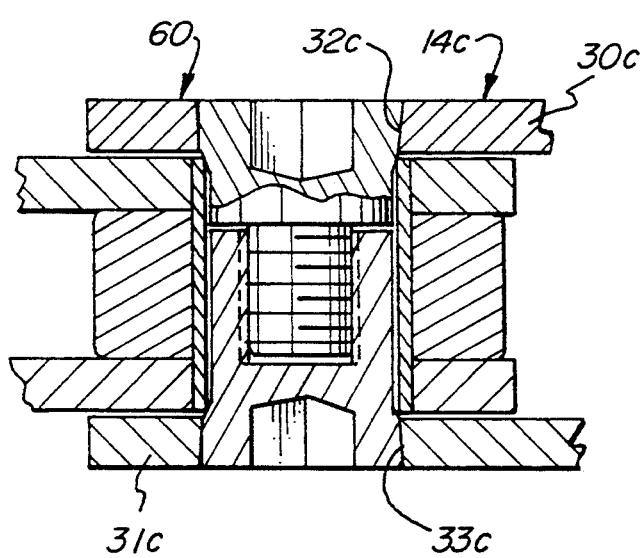
FIG. 9 is a view similar to FIG. 3 showing still another master link assembly embodying the present invention.
Figure 10:
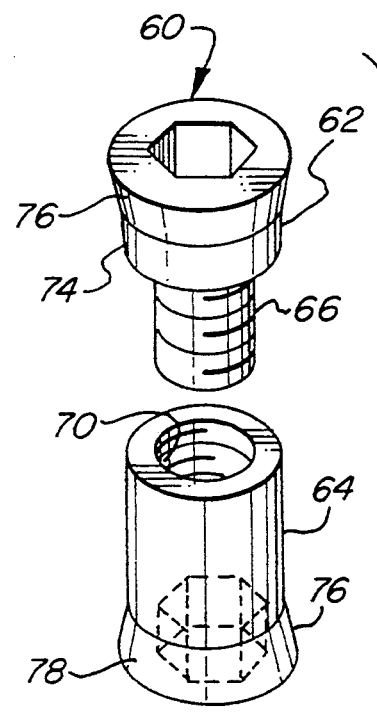
FIG. 10 is a perspective view of the disassembled fastener components of FIG. 9.

Referring next to FIGS. 9 and 10, there is shown a third embodiment of the invention. The fastener 60 is comprised of a male element 62 and a female element 64, with the male element 62 providing a threaded shank 66 and the female element 64 having a threaded bore 70 which receives the shank 66. The male element 62 has a head 74 with outwardly tapering side surface 78 adjacent its outer end and the female element 64 is similarly provided with an enlarged end portion 76 with an outwardly tapered surface 78.

The male element 62 is threaded into the bore 70 of the female element 64 forcing the head 74 on the male element 62 into the aperture 32c in the master link plate 30c and the end portion 76 of the female element 64 into the aperture 33c in the master link plate 31c, thereby preventing the male element 62 and female element 64 from inadvertently disassembling.

Other techniques for locking the fasteners in the master link plates may also be employed such as partially mutilated threads, angularly offset portions of different thread pitch, etc.

In each of the illustrated embodiments, the fasteners of the master link are threadably engaged and locked in that threaded engagement against inadvertent assembly. They are flush with, or slightly recessed in, the master link plates.

When one desires to clean, lubricate, or otherwise maintain the transmission chain, a drive tool with a suitable tip is inserted into the drive recess of the fastener to apply sufficient rotational torque to rotate the fastener and overcome the locking means. Once the threaded fastener 38 is removed, the master link plates 30 and 31 are removed from their position overlapping the roller assemblies 10 at the ends 36 of the transmission chain. This opens the transmission chain and allows its easy removal from the associated equipment, for its lubrication and cleaning.

Thus, it can be seen from the foregoing detailed specification and attached drawings that the transmission chain of the present invention can be easily removed for lubrication and cleaning, provides a threaded fastener which will not inadvertently back out from the plates of the master link and does not extend beyond the side faces of the transmission chain, thereby avoiding breakage and interference with the associated equipment.

Having thus described the invention, what is claimed is:

1. A transmission chain comprising:
   (a) a multiplicity of roller assemblies each comprising a pair of rollers, a pair of roller side plates extending in parallel spaced relationship outwardly of said rollers, and means securing said rollers and side plates in assembly;
   (b) a multiplicity of pairs of link plates extending in parallel spaced relationship outwardly of said side plates and pivotably connecting adjacent ends of said roller assemblies to provide an elongated chain; and
   (c) a master link connecting the ends of said elongated chain and comprising a pair of master link plates with inner and outer surfaces and spaced apart in parallel relationship, said master link plates having end portions overlapping said side plates of the roller assemblies at the ends of said elongated chain with said inner surfaces thereof disposed adjacent said side plates, said master link plates having a pair of spaced apertures therein of substantially equal diameters which are coaxially aligned with the apertures in the adjacent rollers of said roller assemblies at the ends of the chain, said master link also having a pair of threaded fasteners in said apertures of said master link plates and extending between said master link plates and through said side plates and rollers at the adjacent ends of said roller assemblies, said master link pivotably connecting said roller assemblies at said chain ends, said fasteners being threadably engaged in assembly with said master link plates and being of length not greater than the distance between the outer surfaces of said pair of master link plates so that the ends thereof do not extend outwardly thereof.

2. The transmission chain of claim 1 wherein said roller plates and master link plates have aligned apertures therein, and said roller assemblies include a pair of cylindrical bushings disposed between and secured in said apertures of said roller plates, said rollers being rotatably mounted on said bushings and said fasteners extending therethrough.

3. The transmission chain of claim 1 wherein there is included means releasably locking said fasteners in said master link plates.

4. The transmission chain of claim 3 wherein said locking means is a thread locking compound.

5. The transmission chain of claim 3 wherein said locking means is provided by each fastener having that portion of its threaded length seated in the aperture of one master link plate of a different pitch than the thread of said aperture, the forced engagement of said threads of different pitch lockingly engaging said fastener with said master link plate.

6. The transmission chain of claim 3 wherein said locking means is provided by said fasteners having one end complementarily threaded to the thread of the aperture of the master link plate in which it is seated and its other end flared outwardly, said flared end being force fit into the aperture of the master link plate in which it is seated.

7. The transmission chain of claim 1 wherein said threaded fasteners each comprise male and female components with enlarged end portions seated in said apertures of said master link plates and said male components having threaded shanks threadably engaged in threaded bores in said female components.

8. A transmission chain comprising:
   (a) a multiplicity of roller assemblies each comprising a pair of rollers, a pair of roller side plates extending in parallel spaced relationship outwardly of said rollers and having apertures therein aligned with said rollers, a pair of cylindrical bushings disposed between and secured in said apertures of said roller plates with said rollers being rotatably mounted on said bushings, and means securing said bushings and side plates in assembly;
   (b) a multiplicity of pairs of link plates extending in parallel spaced relationship outwardly of said side plates and pivotably connecting adjacent ends of said roller assemblies to provide an elongated chain; and
   (c) a master link connecting the ends of said elongated chain and comprising a pair of master link plates with inner and outer surfaces and spaced apart in parallel relationship, said master link plate having end portions overlapping said side plates of the roller assemblies at the ends of said elongated chain with said inner surfaces thereof disposed adjacent said side plates, said master link plates having a pair of spaced apertures therein of substantially equal diameters which are coaxially aligned with the apertures in said roller side plates and in the adjacent rollers of said roller assemblies at the ends of the chain, said master link assembly also having a pair of threaded fasteners in said apertures of said master link plates extending between said master link plates and through said side plates and rollers at the adjacent ends of said roller assemblies, said master link assembly pivotably connecting said roller assemblies at said chain ends, said fasteners being threadably engaged in assembly with said master link plates and being of length not greater than the distance between the outer surfaces of said pair of master link plates so that the ends thereof do not extend outwardly thereof, and means releasably locking said fasteners in said master link plates.

9. The transmission chain of claim 8 wherein said locking means is a thread locking compound.

10. The transmission chain of claim 8 wherein said locking means is provided by each fastener having that portion of its threaded length seated in the aperture of one master link plate of a different pitch than the thread of said aperture, the forced engagement of said threads of different pitch lockingly engaging said fastener with said master link plate.

11. The transmission chain of claim 8 wherein said locking means is provided by said fasteners having one end complementarily threaded to the thread of the aperture of the master link plate in which it is seated and its other end flared outwardly, said flared end being force fit into the aperture of the master link plate in which it is seated.

12. The transmission chain of claim 8 wherein said threaded fasteners each comprise male and female components with enlarged end portions seated in said apertures of said master link plates and said male components having threaded shanks threadably engaged in threaded bores in said female components.

* * * * *